(12) United States Patent
Hamada et al.

(10) Patent No.: US 8,968,836 B2
(45) Date of Patent: Mar. 3, 2015

(54) ELECTROMAGNETIC WAVE REFLECTIVE FILM AND METHOD FOR PRODUCING SAME

(75) Inventors: Satoru Hamada, Tokyo-to (JP); Shoji Takeshige, Tokyo-to (JP); Keiji Kashima, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 182 days.

(21) Appl. No.: 13/807,144

(22) PCT Filed: May 18, 2011

(86) PCT No.: PCT/JP2011/061389
§ 371 (c)(1),
(2), (4) Date: Dec. 27, 2012

(87) PCT Pub. No.: WO2012/014552
PCT Pub. Date: Feb. 2, 2012

(65) Prior Publication Data
US 2013/0107193 A1 May 2, 2013

(30) Foreign Application Priority Data
Jul. 26, 2010 (JP) ................................. 2010-167351

(51) Int. Cl.
*B05D 5/06* (2006.01)
*G02B 5/30* (2006.01)
*G02F 1/13* (2006.01)

(52) U.S. Cl.
CPC .............. *B05D 5/063* (2013.01); *G02B 5/3016* (2013.01); *G02F 1/1313* (2013.01)
USPC ............................. 427/558; 428/1.1; 349/193

(58) Field of Classification Search
CPC ............. G02B 5/3016; C09K 2219/03; C09K 2019/0448; C09K 19/38
USPC ...................... 349/193; 428/1.1; 427/492, 558
See application file for complete search history.

(56) References Cited

U.S. PATENT DOCUMENTS 6,417,902 B1 7/2002 Greenfield et al.
6,850,310 B1 2/2005 Prechtl et al.
(Continued)

FOREIGN PATENT DOCUMENTS

JP 04-281403 A 10/1992
JP 08-122786 A 5/1996
(Continued)

OTHER PUBLICATIONS

International Search Report: mailed Jul. 12, 2011; PCT/JP2011/061389.

*Primary Examiner* — Shean C Wu
(74) *Attorney, Agent, or Firm* — Ladas & Parry LLP

(57) ABSTRACT

Method for producing an electromagnetic wave reflective film by a first selective reflection layer forming process of using a transparent substrate; applying a first selective reflection layer forming coating solution on the transparent substrate to form a first selective reflection layer forming layer; irradiating the first selective reflection layer forming layer with ultraviolet rays at a dose in the range of 25 mJ/cm² to 800 mJ/cm²; and thereby forming a first selective reflection layer; and a second selective reflection layer forming process of: using a second selective reflection layer forming coating solution; applying the second selective reflection layer forming coating solution on the first selective reflection layer so as to be in direct contact therewith to form a second selective reflection layer forming layer; irradiating the second selective reflection layer forming layer with ultraviolet rays; and thereby forming a second selective reflection layer.

4 Claims, 4 Drawing Sheets

(56) References Cited

U.S. PATENT DOCUMENTS

| | | |
|---|---|---|
| 2005/0074564 A1 | 4/2005 | Yamaoka et al. |
| 2005/0152031 A1* | 7/2005 | Umeya .................. 359/449 |
| 2010/0025641 A1 | 2/2010 | Jimbo et al. |

FOREIGN PATENT DOCUMENTS

| | | |
|---|---|---|
| JP | 2001-100045 A | 4/2001 |
| JP | 2001-154024 A | 6/2001 |
| JP | 2001-519317 A | 10/2001 |
| JP | 2003-029037 A | 1/2003 |
| JP | 2006-039164 A | 2/2006 |
| JP | 2008-209574 A | 9/2008 |
| JP | 2010-061119 A | 3/2010 |
| WO | 99/19267 A1 | 4/1999 |
| WO | 03/062873 A1 | 7/2003 |
| WO | 2010/143682 A1 | 12/2010 |

* cited by examiner

ELECTROMAGNETIC WAVE REFLECTIVE FILM AND METHOD FOR PRODUCING SAME

TECHNICAL FIELD

The present invention relates to an electromagnetic wave reflective film having a configuration in which two or more selective reflection layers that can selectively reflect light in a predetermined wavelength region are laminated on a transparent substrate, and a method for producing the electromagnetic wave reflective film.

BACKGROUND ART

There are known selective reflection members which use cholesteric liquid crystals as a member that can selectively reflect a desired wavelength in the wavelength range of visible rays to infrared rays. Since these selective reflection members are capable of selectively reflecting desired light (electromagnetic waves) only, the selective reflection members are expected to be used as, for example, heat ray reflective films or transmissive insulating films, which transmit visible rays and reflect only heat rays.

In regard to electromagnetic wave reflective films that reflect electromagnetic waves by using cholesteric liquid crystals, for example, the following documents are known. Patent Literature 1 discloses a laminated body comprising a transparent substrate provided with a thin film coating that reflects broadband near-infrared rays, and a filter made of cholesteric liquid crystals having a sharp wavelength selective reflectivity in the near-infrared part. This technology is intended to reflect near-infrared rays with high efficiency, without decreasing the transmittance of visible light. Furthermore, Patent Literature 2 discloses an insulating coating which includes one or more cholesteric layers that reflect at least 40% of incident radiation in the infrared wavelength range. This technology is intended to obtain a desired insulating effect by using cholesteric layers.

Furthermore, Patent Literature 3 discloses a polymer liquid crystal layer structure which comprises a polymer liquid crystal layer having light reflectiveness that has been enhanced by a particular method, and a supporting body supporting this polymer liquid crystal layer, the polymer liquid crystal layer structure having reflectiveness of 35% or higher to light having a particular wavelength. This technology is to be used mainly in liquid crystal displays (LCD), and the reflectiveness of the polymer liquid crystal layer is increased by using a fluorinated nonionic surfactant. Furthermore, Patent Literature 4 discloses a double-sided adhesive film for shielding near-infrared rays, which comprises a near-infrared ray-shielding layer having a selective reflection layer A formed from a polymer solidified substance layer having a cholesteric liquid crystal structure which transmits visible light but selectively reflects near-infrared rays in a particular wavelength range. This technology is mainly used in plasma display panels (PDP), and the influence of electromagnetic waves exerted by PDP to the surroundings is suppressed by the double-sided adhesive film for shielding near-infrared rays.

CITATION LIST

Patent Literature

Patent Literature 1: Japanese Patent Application Publication (JP-A) NO. H04-281403

Patent Literature 2: Japanese Translation of PCT International Application No. 2001-519317
Patent Literature 3: Japanese Patent No. 3,419,568
Patent Literature 4: JP-A No. 2008-209574

SUMMARY OF INVENTION

Technical Problem

However, an electromagnetic wave reflective film using a cholesteric liquid crystal compound usually includes a selective reflection layer which contains a cholesteric liquid crystal compound and is laminated on a transparent substrate, and depending on the cholesteric structure, the electromagnetic wave reflective film exhibits a function of selectively reflecting light in a predetermined wavelength region. That is, the selective reflection layer imparts a selective light reflective function to the electromagnetic wave reflective film. Further, since the wavelength region of the light and the rotating direction of the circular polarization of light that is reflected by the selective reflection layer are attributable to the cholesteric structures, when plural selective reflection layers are used, the selective reflection characteristics of the electromagnetic wave reflective film can be freely controlled. For example, light in plural wavelength regions can be selectively reflected, or even in the same wavelength region, both dextrorotatory circularly polarized light and levorotatory circularly polarized light can be reflected. As such, an electromagnetic wave reflective film in which a cholesteric liquid crystal compound is used is characterized in that the electromagnetic wave reflective film can be designed to be usable in all application by using plural selective reflection layers having different selective reflectivity in combination.

In the case of using plural selective reflection layers in combination, usually, the plural selective reflection layers are laminated on a transparent substrate in a predetermined order, and the resulting laminate is used. As a method of laminating the selective reflection layers in this case, a method of laminating by interposing certain layers between the plural selective reflection layers, without interposing other layers, and a method of laminating the plural selective reflection layers so as to be indirect contact with each other can be conceived. These methods can be used appropriately as necessary, but from the viewpoint of simplifying the production process and providing an electromagnetic wave reflective film having excellent production suitability, it can be said that it is preferable to use the latter method. However, in the method of laminating the plural selective reflection layers so as to be indirect contact, it is contemplated that when a first selective reflection layer is formed and then a second selective reflection layer is formed on the first selective reflection layer, the second selective reflection layer is somehow affected by the first selective reflection layer, and it is difficult to realize desired selective reflection performance in the second selective reflection layer. Therefore, conventionally, under the current situation, the method of laminating plural selective reflection layers to be in direct contact is hardly used. Furthermore, in regard to the problems occurring in the case of using this method, the details are not clearly known.

The inventors of the present invention emphasized the usefulness of the method of laminating plural selective reflection layers so as to be in direct contact, and conducted a thorough investigation in order to develop this method as a method for producing an electromagnetic wave reflective film having excellent productivity. As a result, the inventors confirmed that surely, when a first selective reflection layer is formed, and then a second selective reflection layer is formed on the first selective reflection layer, the second selective reflection layer is affected by the first selective reflection layer, and realizing the selective reflection characteristics in the second selective reflection layer as designed in advance is accompanied by difficulties. As one of specific problems, it was found that a phenomenon such as follows occurs in the second selective reflection layer if the second selective reflection layer is laminated directly on the first selective reflection layer. That is, the second selective reflection layer is designed so as to reflect light in a predetermined wavelength region depending on the cholesteric structure; however, if the second selective reflection layer is laminated so as to be indirect contact with the first selective reflection layer, the wavelength region that is selectively reflected is as initially designed. Furthermore, it was found that the total amount of light to be reflected (that is, transmittance of light in the wavelength region that is selectively reflected) is also adjusted as initially designed, but the proportion of specularly reflected light in the light that is reflected decreases, and the proportion of diffusely reflected light increases. Meanwhile, generally, increasing the proportion of diffusely reflected light is not desirable in electromagnetic wave reflective films. This is because diffuse reflection occurs mainly as a result of non-uniform arrangement of the cholesteric structure, but this non-uniform arrangement causes the occurrence of light scattering, and transparency is impaired.

The present invention was achieved under such circumstances, and it is a main object of the present invention to provide a method for producing an electromagnetic wave reflective film, which can produce an electromagnetic wave reflective film having a configuration in which plural selective reflection layers containing a rodlike compound that forms a cholesteric structure are laminated so as to be in direct contact, and having a small proportion of diffuse reflection in the light that is selectively reflected.

Solution to Problem

The inventors of the present invention conducted a thorough investigation in order to solve the problem described above, and as a result, the inventors found that in the method for forming a second selective reflection layer so as to be in direct contact with the first selective reflection layer, increasing of the proportion of diffuse reflection at the second selective reflection layer can be prevented by controlling the process conditions under a predetermined conditions at the time of forming the first selective reflection layer, thus completing the present invention.

That is, in order to solve the problem described above, the present invention provides a method for producing an electromagnetic wave reflective film, the method comprising steps of: a first selective reflection layer forming process of: using a transparent substrate, applying a first selective reflection layer forming coating solution which contains a rodlike compound represented by the following structural formula (I), a first chiral agent that imparts rotatory properties to the rodlike compound, and a first leveling agent, on the transparent substrate to form a first selective reflection layer forming layer; irradiating the first selective reflection layer forming layer with ultraviolet ray at a dose in the range of 25 mJ/cm² to 800 mJ/cm²; and thereby forming a first selective reflection layer; and a second selective reflection layer forming process of: using a second selective reflection layer forming coating solution which contains a rodlike compound represented by the following structural formula (I), a second chiral agent that imparts rotatory properties to the rodlike compound, and a second leveling agent; applying the second selective reflection layer forming coating solution on the first selective reflection layer so as to be in direct contact therewith to form a second selective reflection layer forming layer; irradiating the second selective reflection layer forming layer with ultraviolet ray; and thereby forming a second selective reflection layer.

[Chemical Formula 1]

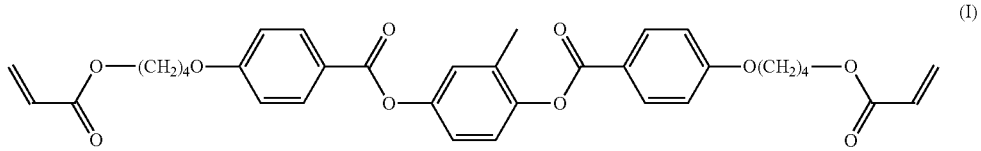

(I)

According to the present invention, when the dose of ultraviolet irradiation irradiated to the first selective reflection layer forming layer in the first selective reflection layer forming process is in the range described above, the proportion of diffusely reflected light in the light that is selectively reflected at the second selective reflection layer in the electromagnetic wave reflective film produced by the present invention can be decreased. Therefore, according to the present invention, an electromagnetic wave reflective film having a small proportion of diffuse reflection in the selectively reflected light can be produced.

In the present invention, it is preferable that a contact angle to pure water of a surface of the first selectively reflection layer be in the range of 65° to 85°. It is because thereby, the proportion of diffusely reflected light in the light that is selectively reflected at the second selective reflection layer in the electromagnetic wave reflective film produced by the present invention can be further decreased.

Furthermore, in the present invention, it is preferable that a Vickers hardness of the surface of the first selective reflection layer be in the range of 5 to 25. It is because thereby, the proportion of diffusely reflected light in the light that is selectively reflected at the second selective reflection layer in the electromagnetic wave reflective film produced by the present invention can be further decreased.

Furthermore, the present invention provides an electromagnetic wave reflective film comprising a transparent substrate; a first selective reflection layer that is formed on the transparent substrate and contains a rodlike compound represented by the following structural formula (I) forming a cholesteric structure; and a second selective reflection layer that is formed on the first selective reflection layer and contains a rodlike compound represented by the following structural formula (I) forming a cholesteric structure, characterized in that the second selective reflection layer is formed so as to be in direct contact with the first selective reflection layer, and a proportion of specularly reflected light in light that is selectively reflected at the second selective reflection layer is 80% or greater.

[Chemical Formula 2]

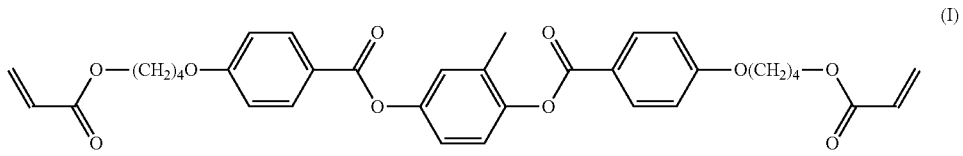

(I)

According to the present invention when the proportion of specularly reflected light in the light that is selectively reflected at the second selective reflection layer is in the range described above, the overall diffuse reflectivity of the electromagnetic wave reflective film can be made lower.

Advantageous Effects of Invention

The present invention offers an effect that an electromagnetic wave reflective film having a small proportion of diffuse reflection in the selectively reflected light can be produced.

selective reflection layer forming coating solution containing a rodlike compound represented by the following structural formula (I), a first chiral agent that imparts rotatory properties to the rodlike compound, and a first leveling agent, on the transparent substrate to form a first selective reflection layer forming layer; irradiating the first selective reflection layer forming layer with ultraviolet rays at a dose in the range of 25 mJ/cm$^2$ to 800 mJ/cm$^2$, and thereby forming a first selective reflection layer; and a second selective reflection layer forming process of: using a second selective reflection layer forming coating solution containing a rodlike compound represented by the following structural formula (I), a second chiral agent that imparts rotatory properties to the rodlike compound, and a second leveling agent; applying the second selective reflection layer forming coating solution on the first selective reflection layer so as to be in direct contact therewith to form a second selective reflection layer forming layer; irradiating the second selective reflection layer forming layer with ultraviolet rays, and thereby forming a second selective reflection layer.

[Chemical Formula 3]

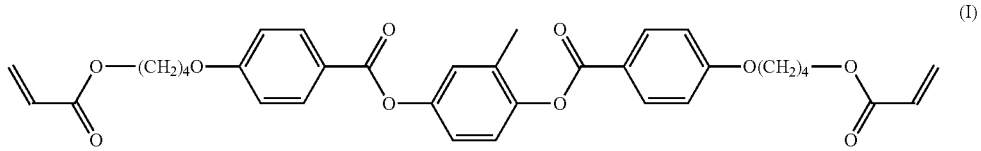

(I)

Figure 4:
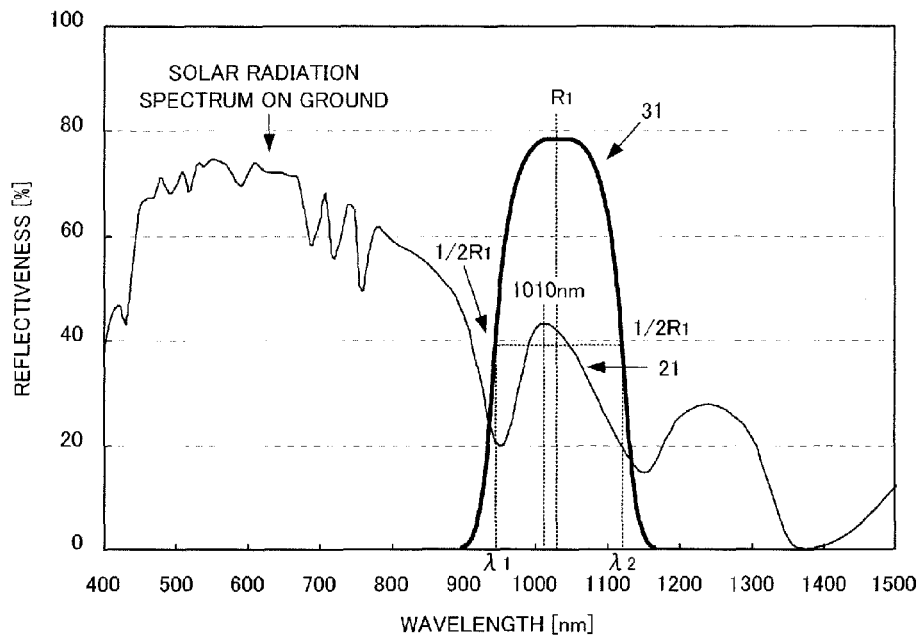

FIG. 4 is a graph illustrating an example of the reflection band exhibited by the electromagnetic wave reflective film of the present invention.

Figure 5:
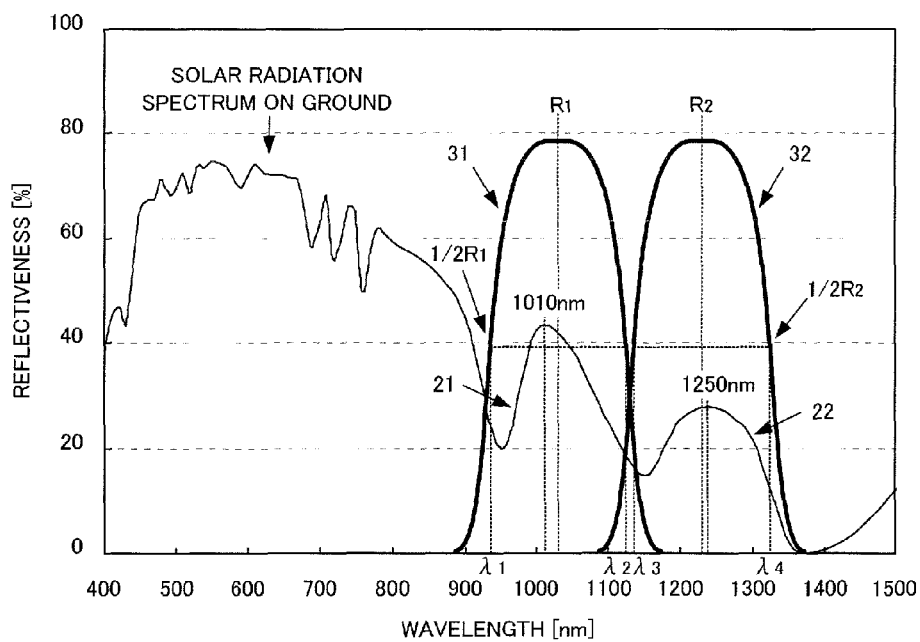

FIG. 5 is a graph illustrating another example of the reflection band exhibited by the electromagnetic wave reflective film of the present invention.

Figure 6A:
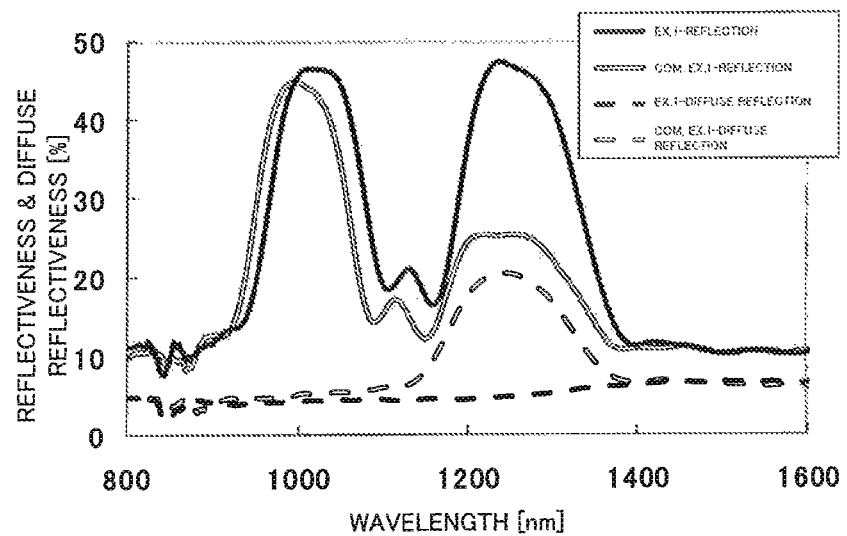
Figure 6B:
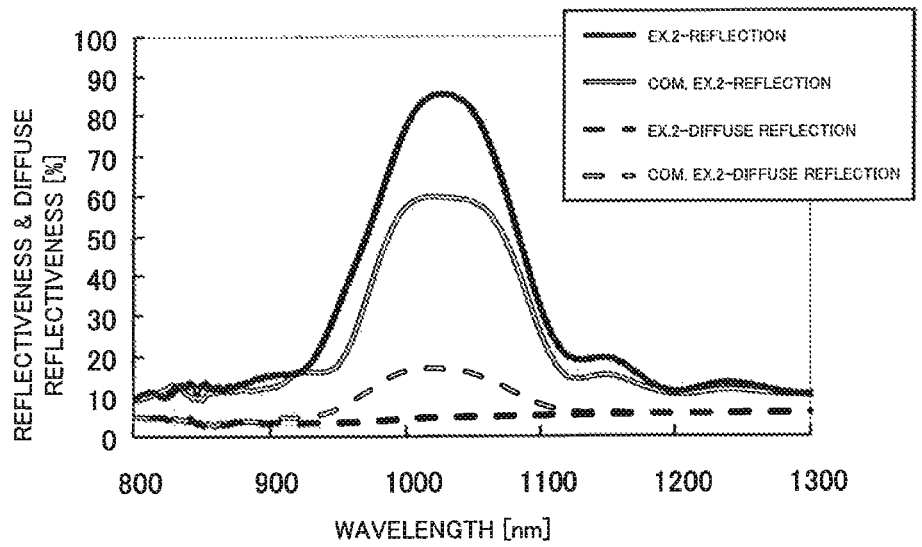

FIGS. 6A and 6B are each is a graph illustrating the reflection spectra of the electromagnetic wave reflective films produced in Examples and Comparative Examples.

DESCRIPTION OF EMBODIMENTS

The present invention relates to a method for producing an electromagnetic wave reflective film, and an electromagnetic wave reflective film. Hereinafter, the respective inventions will be described in detail.

A. Method for Producing Electromagnetic Wave Reflective Film

Figure 1A:
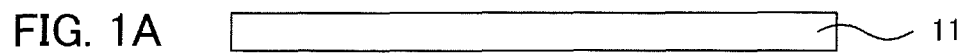
FIGS. 1A to 1G are a process chart illustrating an example of the method for producing an electromagnetic wave reflective film of the present invention.
Figure 1B:
Figure 1C:
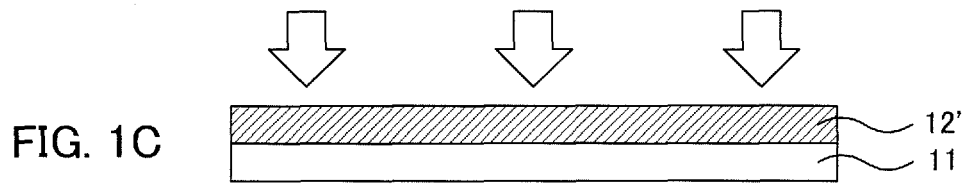
Figure 1D:
Figure 1E:
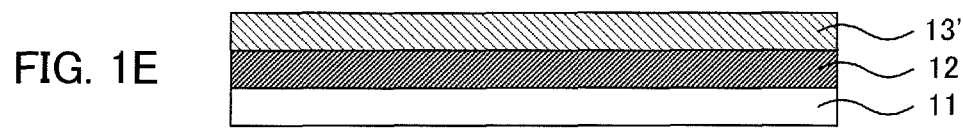
Figure 1F:
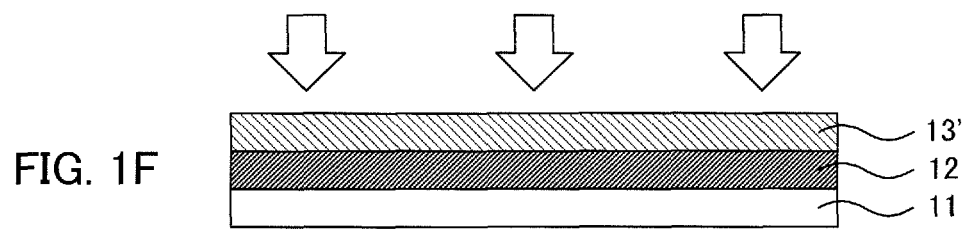
Figure 1G:
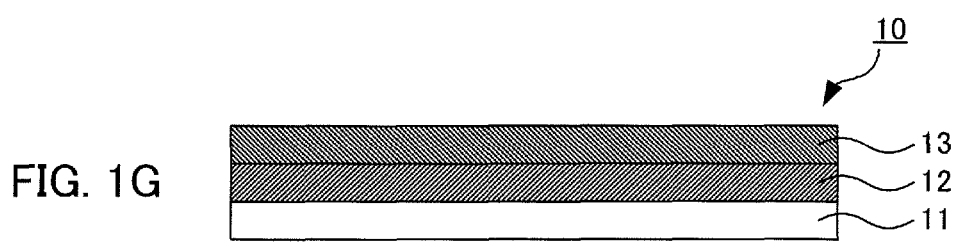

First, the method for producing an electromagnetic wave reflective film of the present invention will be described in detail. As described above, the method for producing an electromagnetic wave reflective film of the present invention comprises steps of: a first selective reflection layer forming process of: using a transparent substrate; applying a first The method for producing an electromagnetic wave reflective film of the present invention as such will be described with reference to the drawings. FIGS. 1A to 1G are a process chart illustrating an example of the method for producing an electromagnetic wave reflective film of the present invention. As illustrated in FIGS. 1A to 1G, the method for producing an electromagnetic wave reflective film of the present invention comprises steps of: a first selective reflection layer forming process (FIG. 1A to FIG. 1D) of using a transparent substrate 11 (FIG. 1A), applying a first selective reflection layer forming coating solution containing a rodlike compound represented by the structural formula (I), a first chiral agent that imparts rotatory properties to the rodlike compound, and a first leveling agent on the transparent substrate 11 to form a first selective reflection layer forming layer 12' (FIG. 1B), irradiating the first selective reflection layer forming layer 12' with ultraviolet rays (FIG. 1C), and thereby forming a first selective reflection layer 12 on the transparent substrate 11 (FIG. 1D); and a second selective reflection layer forming process (FIG. 1E to FIG. 1G) of using a second selective reflection layer forming coating solution containing a rodlike compound represented by the structural formula (I), a second chiral agent that imparts rotatory properties to the rodlike compound, and a second leveling agent, applying the second selective reflection layer forming coating solution on the first selective reflection layer 12 so as to be in direct contact therewith to form a second selective reflection layer forming layer 13' (FIG. 1E), irradiating the second selective reflection layer forming layer 13' (FIG. 1F), and thereby forming a second selective reflection layer 13 (FIG. 1G). By having these processes, the method for producing an electromagnetic wave reflective film of the present invention produces an electromagnetic wave reflective film 10 comprising a first selective reflection layer 12 that is formed on a transparent substrate 11 and contains a rodlike compound forming a cholesteric structure, and a second selective reflection layer 13 that is formed on the first selective reflection layer 12 so as to be indirect contact therewith and contains a rodlike compound forming a cholesteric structure as well.

In such an example, the method for producing an electromagnetic wave reflective film of the present invention is characterized in that the dose of ultraviolet irradiation that is irradiated to the first selective reflection layer forming layer 12' in the first selective reflection layer forming process is in the range of 25 mJ/cm$^2$ to 800 mJ/cm$^2$.

According to the present invention, when the dose of ultraviolet irradiation irradiated to the first selective reflection layer forming layer in the first selective reflection layer forming process is in the range described above, the proportion of diffusely reflected light in the light that is selectively reflected at the second selective reflection layer in the electromagnetic wave reflective film produced by the present invention can be decreased. Furthermore, since the first selective reflection layer is formed on a transparent substrate, the first selective reflection layer hardly exhibits diffuse reflectivity. Therefore, according to the present invention, an electromagnetic wave reflective film having a small proportion of diffuse reflection in the selectively reflected light can be produced.

The method for producing an electromagnetic wave reflective film of the present invention comprises at least a first selective reflection layer forming process and a second selective reflection layer forming process, and if necessary, may comprise other processes. Hereinafter, various steps used in the present invention will be described in order.

1. First Selective Reflection Layer Forming Process

First, a first selective reflection layer forming process according to the present invention will be described. The present process is a process of applying a first selective reflection layer forming coating solution containing a rodlike compound represented by the above structural formula (I), a first chiral agent that imparts rotatory properties to the rodlike compound, and a first leveling agent, on a transparent substrate to form a first selective reflection layer forming layer, irradiating the selective reflection layer forming layer with ultraviolet rays, and thereby forming a first selective reflection layer. The present process is characterized in that the dose of ultraviolet irradiation irradiated to the first selective reflection layer forming layer is in the range of 25 mJ/cm$^2$ to 800 mJ/cm$^2$.

(1) Transparent Substrate

The transparent substrate that is used in the present process will be described. The transparent substrate used in the present process is not particularly limited as long as the transparent substrate can support at least the first selective reflection layer that is formed in the present process, and the second selective reflection layer that is formed in second selective reflection layer forming process that will be described below. Above all, the transparent substrate used in the present process is preferably such that the transmittance in the visible region is 80% or higher, and more preferably 90% or higher. Here, the transmittance of the transparent substrate can be measured according to JIS K7361-1 (method for testing overall transmittance of a plastic-transparent material).

Regarding the transparent substrate that is used in the present process, a flexible material having flexibility as well as a rigid material having no flexibility can all be used as long as the materials have desired transparency. Examples of such a transparent substrate include substrates formed of polyester resins such as polyethylene terephthalate and polyethylene naphthalate; olefin resins such as polyethylene and polymethylpentene; and resins such as acrylic resins, polyurethane resins, polyether sulfone, polycarbonate, polysulfone, polyether, polyether ketone, (meth)acronitrile, cycloolefin polymers, and cycloolefin copolymers. Among them, it is preferable to use a transparent substrate formed of polyethylene terephthalate in the present process. Polyethylene terephthalate is highly useful for general purposes and is easily available.

The thickness of the transparent substrate can be appropriately determined in accordance with the use of the electromagnetic wave reflective film produced by the present invention, the material that constitutes the transparent substrate, or the like, and there are no particular limitations thereon.

(2) First Selective Reflection Layer Forming Coating Solution

Next, the first selective reflection layer forming coating solution that is used in the present process will be described. The first selective reflection layer forming coating solution used in the present process contains at least a rodlike compound, a first chiral agent that imparts rotatory properties to the rodlike compound, and a first leveling agent.

(i) Rodlike Compound

Regarding the rodlike compound that is used in the present process, a compound represented by the structural formula (I) described above is used.

(ii) First Chiral Agent

The first chiral agent that is used in the present process is not particularly limited as long as the agent can impart rotatory properties to the rodlike compound. Also, the first chiral agent that is used in the present process may impart dextrorotatory properties, or may impart levorotatory properties, to the rodlike compound.

The first chiral agent that imparts dextrorotatory properties forms a cholesteric structure by imparting dextrorotatory properties to the rodlike compound. Regarding such a first chiral agent, it is preferable to use, for example, a low molecular weight compound having axial chirality in the molecule, which is represented by the following general formula (A), (B) or (C).

[Chemical Formula 4]
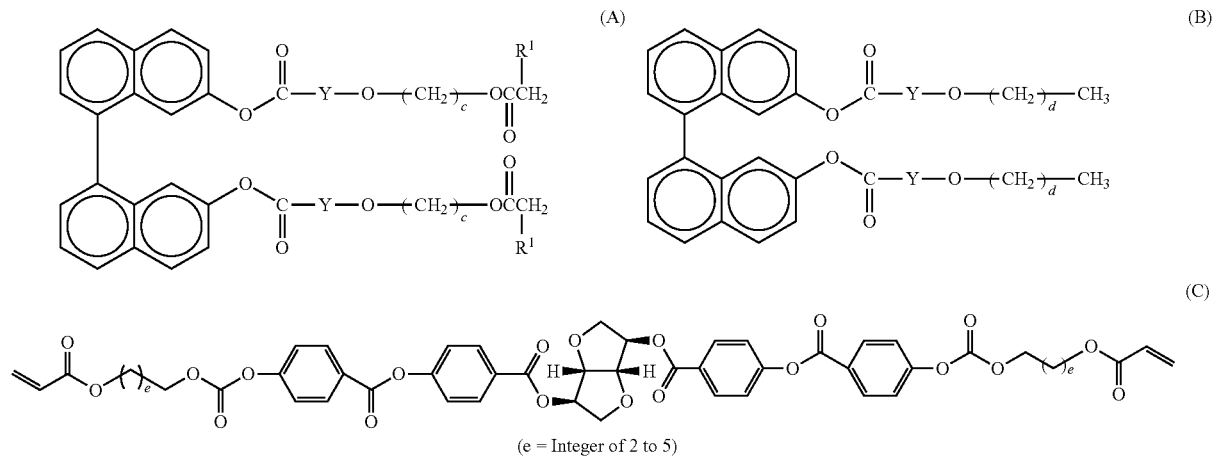
(e = Integer of 2 to 5)
[Chemical Formula 5]
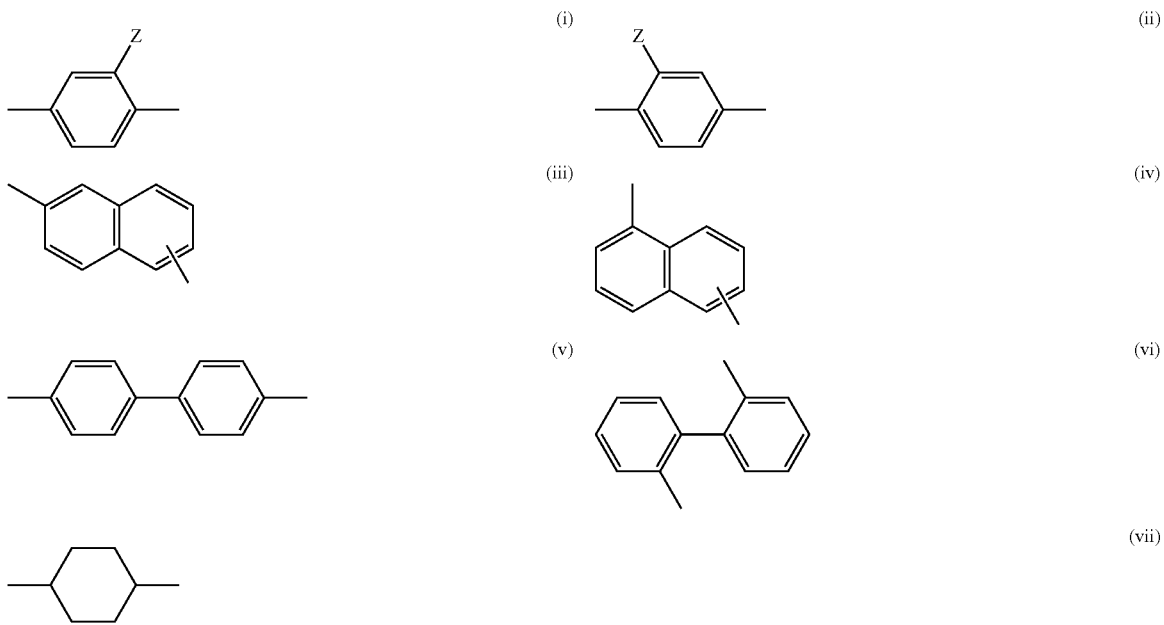
[Chemical Formula 6]
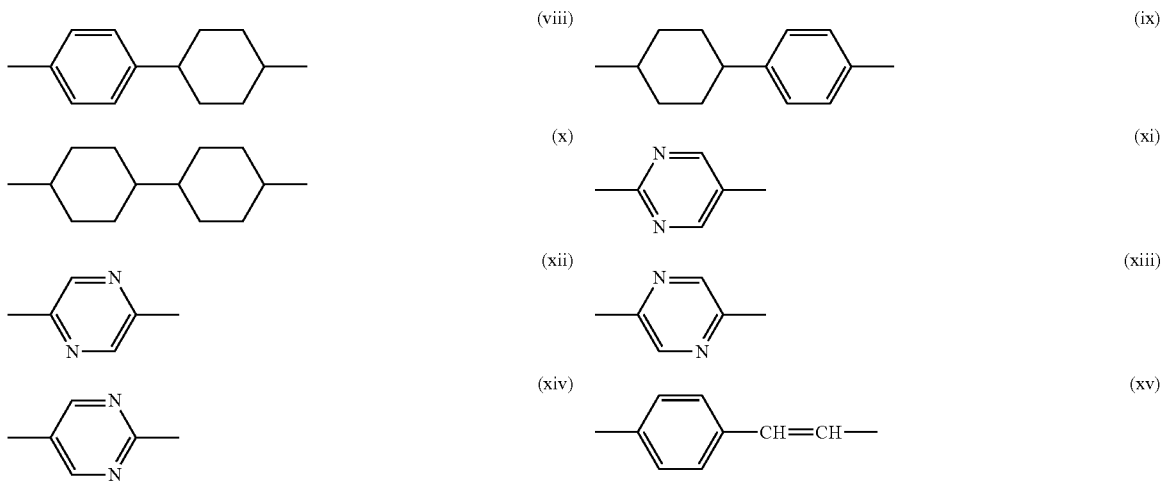

-continued

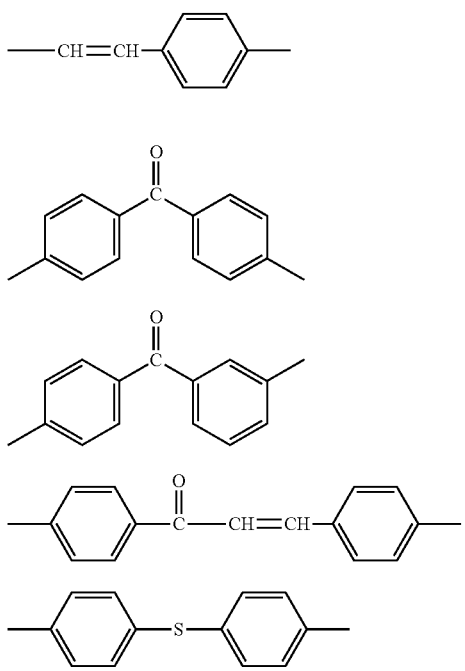

In the general formula (A), $R^1$ represents a hydrogen atom or a methyl group, and Y represents any one of moieties represented by the formulas (i) to (xxiv), but among them, Y is preferably any one of (i), (ii), (iii), (v) and (vii). Furthermore, c and d that represent the chain length of the alkylene group, each independently represent any integer in the range of 2 to 12, but c and d are preferably in the range of 4 to 10, and more preferably in the range of 6 to 9. Furthermore, a compound represented by the following chemical formula can also be used as the first chiral agent.

tive to the total content of the rodlike compound and the first chiral agent may vary with the rotatory properties of the first chiral agent, but for example, in the case of using a first chiral agent which imparts dextrorotatory properties, the proportion is preferably in the range of 1.0% by mass to 5.0% by mass, and above all, in the range of 1.5% by mass to 3.5% by mass. On the other hand, in the case of using a first chiral agent which imparts levorotatory properties, the proportion is preferably in the range of 1.0% by mass to 7.0% by mass, and above all, in the range of 2.0% by mass to 5.0% by mass.

[Chemical Formula 7]

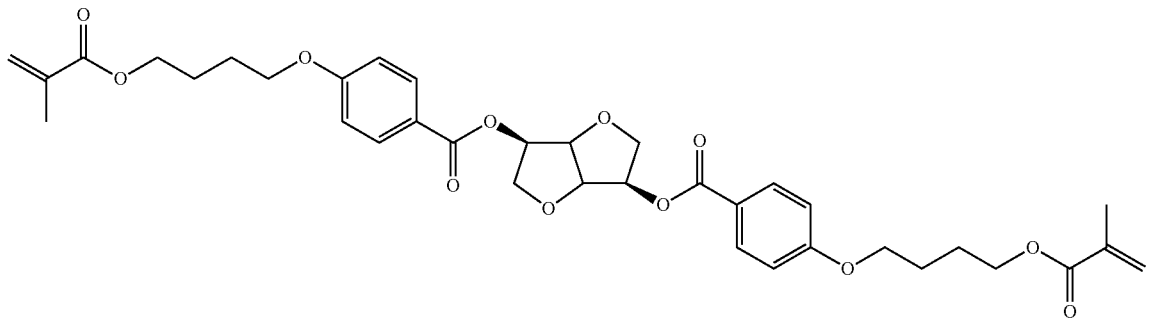

The first chiral agent that imparts levorotatory properties forms a cholesteric structure by imparting levorotatory properties to the rodlike compound. Such a first chiral agent is not particularly limited, but examples thereof include CNL716™ manufactured by ADEKA Corp.

Meanwhile, the wavelength of the light that is reflected by the first selective reflection layer formed in the present process can be regulated by adjusting the content of the first chiral agent in the first selective reflection layer forming coating solution. The proportion of the first chiral agent rela- (iii) First Leveling Agent Next, the first leveling agent that is used in the present process will be described. The first leveling agent used in the present process promotes the formation of a cholesteric structure of the rodlike compound in the first selective reflection layer that is formed in the present process. The first leveling agent that is used in the present process is not particularly limited as long as the cholesteric arrangement of the rodlike compound in the first selective reflection layer that is formed in the present process can be promoted. Examples of such a first leveling agent include silicone compounds, fluorine compounds, acrylic compounds or the like. Any of these compounds can be used as the first leveling agent in the present process. Specific examples of the first leveling agent to be used in the present process include, for example, BYK-361N™ manufactured by BYK-chemie Japan K.K., and S-241™ manufactured by AGC Seimi Chemical Co., Ltd. Any of these first leveling agents can be suitably used in the present process; however, among them, it is more preferable to use BYK-361N™ which is an acrylic compound.

Furthermore, one kind of the first leveling agent may be used in the present process, or two or more kinds may also be used.

The content of the first leveling agent in the first selective reflection layer forming coating solution is not particularly limited as long as the content is in the range in which the cholesteric structure of the rodlike compound can be formed with desired regularity. The specific content is appropriately determined in accordance with the type of the first leveling agent or the like. Above all, in the present process, the content of the first leveling agent in the first selective reflection layer forming coating solution is preferably in the range of 0.01% by mass to 5.0% by mass, and more preferably in the range of 0.03% by mass to 1.0% by mass.

(iv) Other Components

The first selective reflection layer forming coating solution that is used in the present process preferably further contains a polymerization initiator. It is because when the first selective reflection layer is formed in the present process, ultraviolet rays are irradiated for the purpose of polymerizing the rodlike compound, but if the polymerization initiator is included in the first selective reflection layer forming coating solution, the polymerization reaction of the rodlike compound can easily occur in the present process. The type of the polymerization initiator is not particularly limited as long as the polymerization initiator can accelerate the polymerization reaction of the rodlike compound represented by the structural formula (I) described above, and it is preferable that the polymerization initiator be appropriately selected in accordance with the type of energy that is irradiated. Specific examples of such a polymerization initiator include a photopolymerization initiator and a thermal polymerization initiator. Furthermore, when the polymerization initiator is incorporated, the content of the polymerization initiator is not particularly limited if the polymerization initiator can induce the desired polymerization reaction, and the content may be appropriately determined.

Furthermore, as the first selective reflection layer forming coating solution that is used in the present process, a coating solution containing a solvent is usually used. There are no particular limitations on the solvent, as long as it can at least disperse the rodlike compound, the first chiral agent, and the first leveling agent. Examples of such a solvent include cyclohexanone or the like.

(3) Method for Forming First Selective Reflection Layer

Next, the method for forming a first selective reflection layer on the transparent substrate in the present process will be described. In the present process, a first selective reflection layer forming coating solution is applied on a transparent substrate to form a first selective reflection layer forming layer, and a first selective reflection layer is formed by irradiating the selective reflection layer forming layer with ultraviolet rays. Here, the first selective reflection layer forming layer refers to the layer that is in the stage after the first selective reflection layer forming coating solution is applied and before the applied coating solution is irradiated with ultraviolet rays. As ultraviolet rays are irradiated, the applied coating solution becomes the first selective reflection layer.

The method for applying the first selective reflection layer forming coating solution on a transparent substrate, is not particularly limited as long as it is a method capable of applying the first selective reflection layer forming coating solution to a desired thickness, and forming a first selective reflection layer forming layer. A general coating method can be used for such a method, and specific examples thereof include a bar coating method, a spin coating method, and a blade coating method. Furthermore, usually, the first selective reflection layer forming layer is obtained by drying the first selective reflection layer forming coating solution that is applied on the transparent substrate, and removing the solvent.

When the first selective reflection layer forming layer is irradiated with ultraviolet rays, a first selective reflection layer is formed. Ultraviolet rays are irradiated to the first selective reflection layer forming layer in the present process in order to crosslink the rodlike compound forming a cholesteric structure under the action of the first chiral agent and the first leveling agent while the cholesteric structure is maintained, and to make the cholesteric structure not easily disrupted. The present process is characterized in that the dose of ultraviolet irradiation that is irradiated to the first selective reflection layer forming layer is in the range of 25 mJ/cm$^2$ to 800 mJ/cm$^2$. In the method for producing an electromagnetic wave reflective film of the present invention, when the dose of ultraviolet irradiation that is irradiated to the first selective reflection layer forming layer in the present process is in the range described above, the second selective reflection layer that is formed in second selective reflection layer forming process that will be described below can have lower diffuse reflectivity. Here, the dose of ultraviolet irradiation irradiated to the first selective reflection layer forming layer in the present process is adjusted to the range described above, because if the dose of ultraviolet irradiation is less than the range described above, polymerization of the rodlike compound contained in the first selective reflection layer forming layer proceeds insufficiently, and as a result, the cholesteric structure of the rodlike compound in the first selective reflection layer that is formed in the present process is easily disrupted. Furthermore, it is because if the dose of ultraviolet irradiation is greater than the range described above, the first leveling agent may emerge onto the surface of the first selective reflection layer forming layer. The dose of ultraviolet irradiation irradiated to the first selective reflection layer forming layer in the present process is not particularly limited as long as the amount is in the range described above, but the amount is above all preferably in the range of 25 mJ/cm$^2$ to 400 mJ/cm$^2$, and more preferably in the range of 50 mJ/cm$^2$ to 200 mJ/cm$^2$.

(4) First Selective Reflection Layer

Next, the first selective reflection layer that is formed in the present process will be described. The first selective reflection layer formed in the present process has a function of selectively reflecting any one of dextrorotatory circularly polarized light and levorotatory circularly polarized light in a predetermined wavelength range, depending on the cholesteric structure of the rodlike compound. If the cholesteric structure in the first selective reflection layer is a dextrorotatory structure, dextrorotatory circularly polarized light is selectively reflected, and if the cholesteric structure is levorotatory structure, levorotatory circularly polarized light is selectively reflected. Furthermore, the wavelength region of light that is selectively reflected is determined depending on the pitch of the cholesteric structure.

The thickness of the first selective reflection layer that is formed in the present process is not particularly limited as long as the thickness is in the range in which the desired selective reflection function can be imparted to the first selective reflection layer. Therefore, the thickness of the first selective reflection layer is appropriately determined in accordance with factors such as the use of the electromagnetic wave reflective film produced by the present invention, but usually the thickness is preferably in the range of 0.1 µm to 100 µm, more preferably in the range of 0.5 µm to 20 µm, and even more preferably in the range of 1 µm to 10 µm.

Furthermore, the first selective reflection layer that is formed in the present process is such that the contact angle to pure water on the surface of the layer is preferably in the range of 65° to 85°, more preferably in the range of 70° to 85°, and even more preferably in the range of 75° to 80°. It is because when the contact angle to pure water on the surface of the first selective reflection layer is in this range, the proportion of diffusely reflected light in the light that is selectively reflected at the second selective reflection layer in the electromagnetic wave reflective film produced in the present invention can be further decreased. Here, the contact angle to pure water means the contact angle to the surface of the first selective reflection layer on the side where the second selective reflection layer is formed in second selective reflection layer forming process that will be described below. The above-mentioned contact angle means the average value obtained by manually dropping 5.0 microliters of pure water in an environment at 23° C., and taking five measurements. The contact angle can be measured by using, for example, DM-301™ manufactured by Kyowa Interface Science Co., Ltd. as the measuring apparatus. Furthermore, a desired value of the contact angle can be realized by appropriately adjusting the dose of ultraviolet irradiation irradiated to the first selective reflection layer forming layer in the range described above.

The first selective reflection layer that is formed in the present process is such that the Vickers hardness at the surface is preferably in the range of 5 to 25, more preferably in the range of 10 to 25, and even more preferably in the range of 10 to 20. It is because when the Vickers hardness of the surface of the first selective reflection layer is in this range, the proportion of diffusely reflected light in the light that is selectively reflected at the second selective reflection layer in the electromagnetic wave reflective film produced by the present invention can be further decreased. Here, the Vickers hardness means the hardness of the surface of the first selective reflection layer with respect to the surface on the side where the second selective reflection layer is formed in second selective reflection layer forming process that will be described below. The Vickers hardness means the average value obtained by taking five measurements for a sample in a measurement environment at 25° C. under a load of 0.5 mN/10 s, and the Vickers hardness can be measured by using, for example, HM500™ manufactured by Fischer Instruments K.K. as the measuring apparatus. Furthermore, a desired value of the Vickers hardness can be realized by appropriately adjusting the dose of ultraviolet irradiation irradiated to the first selective reflection layer forming layer in the range described above.

2. Second Selective Reflection Layer Forming Process

Next, a second selective reflection layer forming process that is used in the present invention will be described. The present process is a process of using a second selective reflection layer forming coating solution containing a rodlike compound represented by the structural formula (I) described above, a second chiral agent that imparts rotatory properties to the rodlike compound, and a second leveling agent, applying the second selective reflection layer forming coating solution on the first selective reflection layer so as to be in direct contact therewith to form a second selective reflection layer forming layer, irradiating ultraviolet rays to the second selective reflection layer forming layer, and thereby forming a second selective reflection layer.

In the present process, the second selective reflection layer is formed by applying the second selective reflection layer forming coating solution on the first selective reflection layer so as to be in direct contact therewith, but the phrase "to be in direct contact" means that no other layer is interposed between the second selective reflection layer formed in the present process and the first selective reflection layer.

(1) Second Selective Reflection Layer Forming Coating Solution

The second selective reflection layer forming coating solution that is used in the present process contains a rodlike compound represented by the structural formula (I) described above, a second chiral agent, and a second leveling agent. Here, regarding the second chiral agent and the second leveling agent used in the present process, the same agents as those exemplified to be used as the first chiral agent and the first leveling agent that are respectively used in the first selective reflection layer forming coating solution described above, can be used. Meanwhile, the second chiral agent and the second leveling agent that are used in the present process may be the same as the first chiral agent and the first leveling agent that are used in the first selective reflection layer forming coating solution, respectively, or may be different from them. The contents of the second chiral agent and the second leveling agent in the second selective reflection layer forming coating solution can be adjusted to the same extent as the contents of the first chiral agent and the first leveling agent in the first selective reflection layer forming coating solution, respectively.

(2) Method for Forming Second Selective Reflection Layer

Next, the method for forming a second selective reflection layer in the present process will be described. In the present process, the second selective reflection layer is formed by applying the second selective reflection layer forming coating solution on the first selective reflection layer formed in first selective reflection layer forming process so as to be indirect contact therewith to form a second selective reflection layer forming layer, and irradiating the second selective reflection layer forming layer with ultraviolet rays. Here, the second selective reflection layer forming layer refers to the layer that is in the stage after the second selective reflection layer forming coating solution is applied and before the applied coating solution is irradiated with ultraviolet rays. As ultraviolet rays are irradiated, the applied coating solution becomes the second selective reflection layer.

The method for applying the second selective reflection layer forming coating solution on the first selective reflection layer is not particularly limited as long as it is a method capable of applying the second selective reflection layer forming coating solution to a desired thickness, and forming the second selective reflection layer forming layer. A general coating method can be used for such a method, and specific examples thereof include a bar coating method, a spin coating method, and blade coating method. Furthermore, usually, the second selective reflection layer forming layer is obtained by drying the second selective reflection layer forming coating solution that is applied on the first selective reflection layer, and removing the solvent.

When the second selective reflection layer forming layer is irradiated with ultraviolet rays, a second selective reflection layer is formed. Ultraviolet rays are irradiated to the second selective reflection layer forming layer in the present process, similarly to the case of first selective reflection layer forming process, in order to crosslink the rodlike compound forming a cholesteric structure under the action of the second chiral agent and the second leveling agent while the cholesteric structure is maintained, and to make the cholesteric structure not easily disrupted. The dose of ultraviolet irradiation irradiated to the second selective reflection layer forming layer in the present process is appropriately determined in accordance with the configuration of the electromagnetic wave reflective film produced by the present invention. Specifically, in the case where the electromagnetic wave reflective film produced by the present invention has only the first selective reflection layer and the second selective reflection layer as the selective reflection layers, the dose of ultraviolet irradiation irradiated to the second selective reflection layer forming layer is not particularly limited as long as the dose is in the range in which the rodlike compound can be sufficiently polymerized. Therefore, specifically what amount of ultraviolet rays should be irradiated is appropriately determined in accordance with the use or the like of the electromagnetic wave reflective film produced by the present invention. For example, when the use of the electromagnetic wave reflective film produced by the present invention is such that the second selective reflection layer is not likely to be subjected to heat at 80° C. or higher or a load of atmospheric pressure or higher, it can be usually said that there is no particular problem if the dose of ultraviolet irradiation irradiated to the second selective reflection layer forming layer is 200 mJ/cm$^2$ or greater, unless particularly stated otherwise. On the other hand, for example, when the electromagnetic wave reflective film produced by the present invention is used for a laminated glass for automobiles, since the second selective reflection layer is under the circumstances of high temperature and high pressure in this case, the dose of ultraviolet irradiation irradiated to the second selective reflection layer forming layer is usually considered to be about 800 mJ/cm$^2$.

Furthermore, when the electromagnetic wave reflective film produced by the present invention has a configuration in which, in addition to the first selective reflection layer and the second selective reflection layer, supplementary selective reflection layers such as a third selective reflection layer and a fourth selective reflection layer are further laminated on the second selective reflection layer, the dose of ultraviolet irradiation irradiated to the second selective reflection layer forming layer in the present process is, similarly to the dose of ultraviolet irradiation irradiated to the first selective reflection layer forming layer, preferably in the range of 25 mJ/cm$^2$ to 800 mJ/cm$^2$, more preferably in the range of 25 mJ/cm$^2$ to 400 mJ/cm$^2$, and even more preferably in the range of 50 mJ/cm$^2$ to 200 mJ/cm$^2$. It is because, for example, when a third selective reflection layer is formed on the second selective reflection layer, similarly to the case where the diffuse reflectivity of the second selective reflection layer can be reduced by adjusting the dose of ultraviolet irradiation irradiated to the first selective reflection layer forming layer to the range described above, the diffuse reflectivity of the third selective reflection layer can be reduced by adjusting the dose of ultraviolet irradiation irradiated to the second selective reflection layer forming layer to the range described above. Meanwhile, the same also applies to the dose of ultraviolet irradiation irradiated to the third selective reflection layer forming layer in the case of forming a fourth selective reflection layer on the third selective reflection layer.

(3) Second Selective Reflection Layer

Next, the second selective reflection layer that is formed in the present process will be described. The second selective reflection layer that is formed in the present process has a function of selectively reflecting any one of dextrorotatory circularly polarized light and levorotatory circularly polarized light in a predetermined wavelength range, depending on the cholesteric structure of the rodlike compound. If the cholesteric structure in the second selective reflection layer is a dextrorotatory structure, dextrorotatory circularly polarized light is selectively reflected, and if the cholesteric structure is levorotatory structure, levorotatory circularly polarized light is selectively reflected. Furthermore, the wavelength region of light that is selectively reflected is determined depending on the pitch of the cholesteric structure.

The thickness of the second selective reflection layer that is formed in the present process is not particularly limited as long as the thickness is in the range in which the desired selective reflection function can be imparted to the second selective reflection layer. Therefore, the thickness of the second selective reflection layer is appropriately determined in accordance with the use or the like of the electromagnetic wave reflective film produced by the present invention, but usually the thickness is preferably in the range of 0.1 μm to 100 μm, more preferably in the range of 0.5 μm to 20 μm, and even more preferably in the range of 1 μm to 10 μm.

3. Other Processes

The method for producing an electromagnetic wave reflective film of the present invention comprises at least the first selective reflection layer forming process and the second selective reflection layer forming process as described above, but other arbitrary processes may also be used as necessary. There are no particular limitations on the arbitrary processes as long as an electromagnetic wave reflective film having a desired configuration or function can be produced in accordance with the use or the like of the electromagnetic wave reflective film produced by the present invention. Examples of such arbitrary processes include, for example, supplementary selective reflection layer forming processes of forming supplementary selective reflection layers on the second selective reflection layer, such as a third selective reflection layer forming process of forming a third selective reflection layer on the second selective reflection layer, and a fourth selective reflection layer forming process of forming a fourth selective reflection layer on the third selective reflection layer. In these supplementary selective reflection layer forming processes, plural processes may also be used.

In the supplementary selective reflection layer forming processes described above, regarding the method for forming supplementary selective reflection layers such as a third selective reflection layer and a fourth selective reflection layer, a supplementary selective reflection layer forming layer can be formed in the same manner as in the method for forming the second selective reflection layer in the second selective reflection layer forming process described above, by applying a supplementary selective reflection layer forming coating solution containing a rodlike compound, a chiral agent and a leveling agent, and irradiating the relevant supplementary selective reflection layer forming layer with ultraviolet rays. Here, regarding the dose of ultraviolet irradiation irradiated to the supplementary selective reflection layer forming layer, in the case where the supplementary selective reflection layer to be formed is located in the outermost layer in the electromagnetic wave reflective film, the dose of ultraviolet irradiation is considered to be 200 mJ/cm$^2$ or greater. Specifically, what amount of ultraviolet rays should be irradiated is appropriately determined in accordance with the use or the like of the electromagnetic wave reflective film produced by the present invention. On the other hand, when it is expected to form a new supplementary selective reflection layer on a supplementary selective reflection layer to be formed (for example, when it is expected to form a fourth selective reflection layer on a third selective reflection layer), the dose of ultraviolet irradiation irradiated to the supplementary selective reflection layer forming layer (the third selective reflection layer forming layer in the preceding example) is preferably in the range of 25 mJ/cm$^2$ to 800 mJ/cm$^2$, more preferably in the range of 25 mJ/cm$^2$ to 400 mJ/cm$^2$, and even more preferably in the range of 50 mJ/cm$^2$ to 200 mJ/cm$^2$. It is because, similarly to the case where the diffuse reflectivity of the second selective reflection layer can be reduced by adjusting the dose of ultraviolet irradiation irradiated to the first selective reflection layer forming layer to the range described above, the diffuse reflectivity of the supplementary selective reflection layer that is further laminated can be reduced by adjusting the dose of ultraviolet irradiation irradiated to the supplementary selective reflection layer forming layer to the range described above.

Meanwhile, regarding the rodlike compound, chiral agent, and leveling agent that are used in the supplementary selective reflection layer forming coating solution described above, the same compounds as the rodlike compound, the first chiral agent and the first leveling agent used in the first selective reflection layer forming coating solution described above can be used.

4. Electromagnetic Wave Reflective Film

The electromagnetic wave reflective film produced by the present invention comprises a transparent substrate, a first selective reflection layer formed on the transparent substrate, and a second selective reflection layer formed on the first selective reflection layer so as to be in direct contact therewith, with the diffuse reflectivity of the second selective reflection layer being reduced. Since the first selective reflection layer is formed on a transparent substrate, the first selective reflection layer hardly exhibits diffuse reflectivity. From this point of view, the electromagnetic wave reflective film produced by the present invention has markedly low overall diffuse reflectivity.

In regard to such an electromagnetic wave reflective film, since detailed descriptions will be given in the section of "B. Electromagnetic wave reflective film" that will be described below, further explanation will not be repeated here.

B. Electromagnetic Wave Reflective Film

Next, the electromagnetic wave reflective film of the present invention will be explained. As discussed above, the electromagnetic wave reflective film of the present invention comprises a transparent substrate; a first selective reflection layer that is formed on the transparent substrate and contains a rodlike compound represented by the structural formula (I) which forms a cholesteric structure; and a second selective reflection layer that is formed on the first selective reflection layer and contains a rodlike compound represented by the structural formula (I) which forms a cholesteric structure, characterized in that the second selective reflection layer is formed on the first selective reflection layer so as to be in direct contact therewith, and the proportion of specularly reflected light in the light that is selectively reflected at the second selective reflection is 80% or greater.

Figure 2:
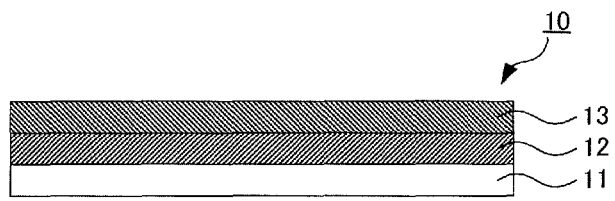
FIG. 2 is a schematic sectional view illustrating an example of the electromagnetic wave reflective film of the present invention.

Such an electromagnetic wave reflective film of the present invention will be described with reference to the drawings. FIG. 2 is a schematic sectional view illustrating an example of the electromagnetic wave reflective film of the present invention. As illustrated in FIG. 2, the electromagnetic wave reflective film 10 of the present invention comprises a transparent substrate 11, a first selective reflection layer 12 formed on the transparent substrate 11, and a second selective reflection layer 13 formed on the first selective reflection layer 12. Here, the first selective reflection layer 12 and the second selective reflection layer 13 all contain the rodlike compound represented by the structural formula (I) which forms a cholesteric structure. In such an example, the electromagnetic wave reflective film 10 of the present invention is such that the second selective reflection layer 13 is formed on the first selective reflection layer 12 so as to be in direct contact therewith, and the proportion of specularly reflected light in the light that is selectively reflected at the second selective reflection layer 13 is 80% or greater.

According to the present invention, when the proportion of specularly reflected light in the light that is selectively reflected at the second selective reflection layer is in the range described above, the overall diffuse reflectivity of the electromagnetic wave reflective film can be decreased.

The electromagnetic wave reflective film of the present invention comprises at least a transparent substrate, a first selective reflection layer, and a second selective reflection layer, and may have other configurations as necessary. The various configurations that are used in the present invention will be described in order below.

Meanwhile, in regard to the transparent substrate that is used in the present invention, since the same matters as those described in the section "A. Method for producing electromagnetic wave reflective film" apply, further explanation will not be repeated here.

1. Second Selective Reflection Layer

First, the second selective reflection layer that is used in the present invention will be explained. The second selective reflection layer has a function of selectively reflecting any one of dextrorotatory circularly polarized light and levorotatory circularly polarized light in a predetermined wavelength range, depending on the cholesteric structure of the rodlike compound. The second selective reflection layer used in the present invention is formed on the first selective reflection layer that will be described below so as to be in direct contact therewith, and contains a rodlike compound represented by the structural formula (I) that forms a cholesteric structure. Furthermore, the second selective reflection layer used in the present invention is characterized in that the proportion of specularly reflected light in the light that is selectively reflected at the second selective reflection layer is 80% or greater.

Here, when it is said that the second selective reflection layer is "formed on the first selective reflection layer so as to be in direct contact therewith," it is implied that the second selective reflection layer and the first selective reflection layer are laminated without having other layers interposed between the two layers.

There are no particular limitations on the proportion of specularly reflected light in the light that is selectively reflected at the second selective reflection layer according to the present invention as long as the proportion is 80% or greater. Here, the proportion of specularly reflected light in the light that is selectively reflected at the second selective reflection layer is adjusted to the above-described range in the present invention, because if the proportion is smaller than the range described above, scattering of light that occurs as a result of non-uniform arrangement of the cholesteric structure occurs, and transparency is impaired. There are no particular limitations on the proportion of light that is specularly reflected at the second selective reflection layer in the present invention as long as the proportion is in the range described above; however, the proportion is preferably 85% or greater, and more preferably 90% or greater. Meanwhile, the proportion of light that is specularly reflected at the second selective reflection layer can be measured, for example, according to the following method. First, the transmittance in the wavelength region that is selectively reflected by the second selective reflection layer is measured (at this time, the wavelength region that is selectively reflected by the first selective reflection layer may also be included). Subsequently, the components of specular reflection are measured for 5 times, and then the diffuse reflectiveness is measured. Here, since the relationship of 100−transmittance peak [%]=reflectiveness peak [%]+diffuse reflectiveness peak [%] is established, the specular reflectiveness of the second selective reflection layer can be determined by calculating the reflectiveness peak [%]/(reflectiveness peak [%]+diffuse reflectiveness peak [%]). Meanwhile, when the wavelength region that is selectively reflected by the first selective reflection layer and the wavelength region that is selectively reflected by the second selective reflection layer overlap, and the rotatory properties of the circular polarization of light that is reflected at the two layers differ from each other, the measurement can be made only for the second selective reflection layer by inserting a polarization plate and a $\lambda/4$ plate into the light source at the time of each measurement, and extracting the light of the component that is reflected at the second selective reflection layer. As the measuring apparatus, for example, UV-3100™ manufactured by Shimadzu Corp. can be used.

The thickness of the second selective reflection layer used in the present invention is not particularly limited as long as the thickness is in the range by which the function of selectively reflecting light in a predetermined wavelength region can be realized, and the thickness can be appropriately determined in accordance with the use or the like of the electromagnetic wave reflective film of the present invention. Above all, the thickness of the second selective reflection layer according to the present invention is preferably in the range of 0.1 µm to 100 µm, more preferably in the range of 0.5 µm to 20 µm, and even more preferably in the range of 1 µm to 10 µm.

The cholesteric structure of the rodlike compound in the second selective reflection layer may be a dextrorotatory structure or may be a levorotatory structure. Furthermore, the second selective reflection layer may contain a chiral agent in order to form such a dextrorotatory structure or a levorotatory structure. Also, the second selective reflection layer may contain a leveling agent in order to make the cholesteric structure of the rodlike compound more regular. In regard to the chiral agent and the leveling agent that are used in the second selective reflection layer, the same agents as those described in the section of "A. Method for producing electromagnetic wave reflective film" as the second chiral agent and the second leveling agent that are contained in the second selective reflection layer forming coating solution that is used in second selective reflection layer forming process, can be used.

2. First Selective Reflection Layer

Next, the first selective reflection layer that is used in the present invention will be explained. Similarly to the second selective reflection layer, the first selective reflection layer also has a function of selectively reflecting any one of dextrorotatory circularly polarized light and levorotatory circularly polarized light in a predetermined wavelength range depending on the cholesteric structure of the rodlike compound. Furthermore, the first selective reflection layer that is used in the present invention is formed on a transparent substrate and contains a rodlike compound represented by the structural formula (I) that forms a cholesteric structure.

The thickness of the first selective reflection layer used in the present invention is not particularly limited as long as the thickness is in the range by which the function of selectively reflecting light in a predetermined wavelength region can be realized, and the thickness can be appropriately determined in accordance with the use or the like of the electromagnetic wave reflective film of the present invention. Above all, the thickness of the first selective reflection layer according to the present invention is preferably in the range of 0.1 µm to 100 µm, more preferably in the range of 0.5 µm to 20 µm, and even more preferably in the range of 1 µm to 10 µm. Furthermore, the cholesteric structure of the rodlike compound in the first selective reflection layer may be a dextrorotatory structure or may be a levorotatory structure. Furthermore, the first selective reflection layer may also contain a chiral agent in order to form such a dextrorotatory structure or a levorotatory structure. Also, the first selective reflection layer may contain a leveling agent in order to make the cholesteric structure of the rodlike compound more regular. In regard to the chiral agent and the leveling agent that are used in the first selective reflection layer, the same agents as those described in the section of "A. Method for producing electromagnetic wave reflective film" as the first chiral agent and the first leveling agent that are contained in the first selective reflection layer forming coating solution that is used in first selective reflection layer forming process, can be used.

3. Other Configurations

The electromagnetic wave reflective film of the present invention comprises at least a transparent substrate, a first selective reflection layer, and a second selective reflection layer, and may comprise other configurations as necessary. There are no particular limitations on the other configurations, and a configuration having a desired function can be appropriately selected and used in accordance with the use or the like of the electromagnetic wave reflective film of the present invention. Examples of such other configurations include, for example, a supplementary selective reflection layer that is formed on the second selective reflection layer and contains a rodlike compound which forms a cholesteric structure. In the present invention, such a supplementary selective reflection layer can be used as a single layer or by laminating plural layers.

The rodlike compound that is used in the supplementary selective reflection layer is not particularly limited as long as it is a rodlike compound which can form a cholesteric structure, but similarly to the compound that is used in the first selective reflection layer and the second selective reflection layer, the rodlike compound represented by the structural formula (I) is preferably used. Furthermore, the supplementary selective reflection layer may also contain a chiral agent and a leveling agent as necessary. In regard to the chiral agent and the leveling agent that are used in the supplementary selective reflection layer, the same agents as the second chiral agent and the second leveling agent that are used in the second selective reflection layer can be used.

4. Electromagnetic Wave Reflective Film

The electromagnetic wave reflective film of the present invention has a function of reflecting the electromagnetic waves of the dextrorotatory circularly polarized component or levorotatory circularly polarized component in a particular wavelength region, in accordance with the rotatory properties of the cholesteric structure in the first selective reflection layer and the second selective reflection layer. Here, the rodlike compound forming a cholesteric structure has a property of selectively reflecting any one polarized light between the two, dextrorotatory and levorotatory circularly polarized light of the incident light (electromagnetic waves) along the helical axis of a planar arrangement. The maximum optical rotation polarization light scattering in this case occurs at the selective wavelength λ in the following formula (1):

$$\lambda = n_{av} \cdot p \qquad (1).$$

Meanwhile, in the formula (1), $n_{av}$ represents the average refractive index in a plane that is perpendicular to the helical axis, and "p" represents the helical pitch in the helical structure of the rodlike compound.

Furthermore, the band width Δλ of the reflection wavelength is represented by the following formula (2):

$$\Delta\lambda = \Delta n \cdot p \qquad (2).$$

Meanwhile, in the formula (2), Δn represents the birefringence of the rodlike compound. As indicated in these formulas, a selective reflection layer containing a rodlike compound which forms a cholesteric structure, reflects any one of dextrorotatory and levorotatory circular polarized light components of light (electromagnetic waves) in the range of the wavelength band width Δλ centered around a selective wavelength λ, while transmits the other circular polarized light component and unpolarized light (electromagnetic waves) in other wavelength region. Therefore, in regard to the electromagnetic wave reflective film of the present invention, desired electromagnetic waves can be reflected by appropriately controlling "p" of the rodlike compound.

The electromagnetic wave reflective film of the present invention preferably has a reflection peak in the infrared region (a region of λ=800 nm or greater). It is because thereby, the electromagnetic wave reflective film can be used as an infrared rays reflective film useful in a heat ray reflective glass for automobiles, a heat ray reflective glass for construction, a heat ray reflective film for solar cells, and the like.

Among them, the electromagnetic wave reflective film of the present invention preferably has at least a first reflection band corresponding to the first radiant energy band including the peaks that are positioned on the shortest wavelength side in the infrared region of the solar radiation spectrum on the ground, and particularly, when the maximum reflectiveness in the first reflection band is designated as $R_1$, and the wavelength on the shorter wavelength side at which the reflectiveness is reduced to half the value of $R_1$ is designated $\lambda_1$, it is preferable that $\lambda_1$ be in the range of 900 nm to 1010 nm (first embodiment). It is because the infrared rays included in the first radiant energy band can be highly efficiently reflected. Such an electromagnetic wave reflective film of the first embodiment can be obtained by making the first selective reflection layer and the second selective reflection layer to respectively have the first reflection band, and enabling the first selective reflection layer to selectively reflect dextrorotatory circularly polarized light, while enabling the second selective reflection layer to selectively reflect levorotatory circularly polarized light; or in reverse, can be obtained by enabling the first selective reflection layer to selectively reflect levorotatory circularly polarized light, while enable the second selective reflection layer to selectively reflect dextrorotatory circularly polarized light.

Figure 3:
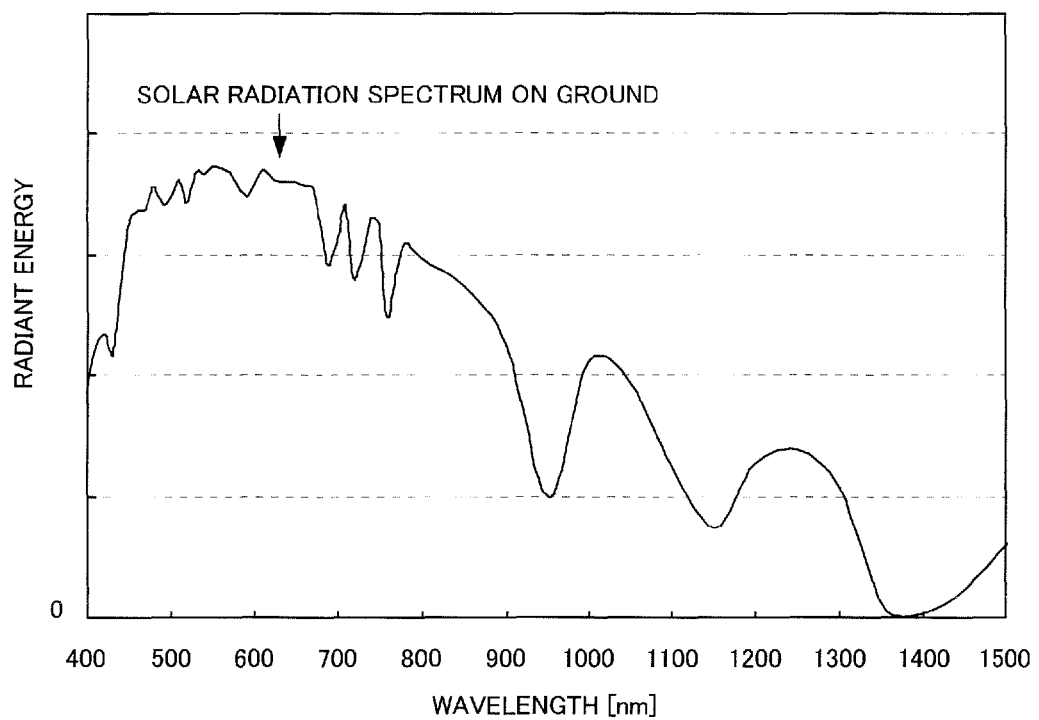
FIG. 3 is a solar radiation spectrum on the ground.

The reflection band of such an electromagnetic wave reflective film of the first embodiment will be explained with reference to the drawings. FIG. 3 is the solar radiation spectrum on the ground. This "solar radiation spectrum on the ground" indicates the distribution of the radiant energy (Wm$^{-2}$/nm) of average solar light on the ground in the temperate zone (AM1.5G). Meanwhile, in the solar radiation spectrum on the Earth orbit (AMO), the distribution of radiant energy is mild; however, the radiant energy is attenuated as a result of reflection, scattering, absorption and the like in the atmosphere. As a result, on the ground, a solar radiation spectrum such as that illustrated in FIG. 3 can be obtained. Meanwhile, in the present specification, the "solar radiation spectrum on the ground" may be simply referred to as "solar radiation spectrum."

FIG. 4 presents an exemplary reflection band of the electromagnetic wave reflective film of the first embodiment. As illustrated in FIG. 4, the electromagnetic wave reflective film of the first embodiment has a first reflection band 31 corresponding to the first radiant energy band 21 which includes peaks that are located on the shortest wavelength side of the infrared region in the solar radiation spectrum on the ground. The first radiant energy band 21 usually has a peak at near the wavelength of 1010 nm, and the wavelength range is 950 nm to 1150 nm. The first reflection band 31 means that the wavelength that gives the maximum reflectiveness $R_1$ is within the wavelength range of the first radiant energy band 21. In the first embodiment, when the wavelength on the shorter wavelength side at which the reflectiveness is reduced to half the value of the maximum reflectiveness $R_1$ (½$R_1$) is designated as $\lambda_1$, it is preferable that $\lambda_1$ be in the range of 900 nm to 1010 nm.

Here, the reason why the upper limit of $\lambda_1$ is 1010 nm is as follows. That is, the peak wavelength of the first radiant energy band of the solar radiation spectrum is near 1010 nm, and in the vicinity of the peak wavelength, the energy density of infrared rays increases. Therefore, in order to achieve efficient reflection of infrared rays near the peak wavelength of the first radiant energy band, it is preferable that $\lambda_1$ at which the reflectiveness is reduced to half the value of the maximum reflectiveness R1, is less than or equal to the peak wavelength of the first radiant energy band.

Meanwhile, in the first embodiment, the upper limit of $\lambda_1$ is preferably 970 nm, more preferably 960 nm, and even more preferably 950 nm. The reason why it is more preferable that the upper limit of $\lambda_1$ be 950 nm is as follows. That is, when the peak intensity in the first radiant energy band of the solar radiation spectrum is designated as $R_{S1}$, and the solar radiation spectrum wavelength on the shorter wavelength side at which the intensity is decreased to half the value of $R_{S1}$ is designated as $\lambda_{S1}$, $\lambda_{S1}$ is near 950 nm. Therefore, by setting the value of $\lambda_1$ such that the relationship of $\lambda_1 \leq \lambda_{S1}$ is satisfied, the first reflection band can cover most of the part with a large energy density of infrared rays in the first radiant energy band. Therefore, reflection of infrared rays can be carried out more effectively.

On the other hand, the reason why it is preferable that the lower limit of $\lambda_1$ be 900 nm is as follows. That is, since $\lambda_1$ is the wavelength at which the reflectiveness is half the value of the reflectiveness of $R_1$, the first reflection band has a skirting reflection region on the shorter wavelength side than $\lambda_1$. The wavelength range of this skirting reflection range is speculated to be about 100 nm at the maximum in the current materials system. Therefore, when the lower limit of $\lambda_1$ is less than 900 nm, the shortest wavelength in the skirting reflection range is less than 800 nm, and there is a possibility that the skirting wavelength region may reach the visible region. In that case, there is a possibility that the electromagnetic wave reflective film of the present invention may have a tinge of red color, and the visibility through the electromagnetic wave reflective film may decrease. Therefore, the lower limit of $\lambda_1$ is preferably 900 nm.

Furthermore, in the first embodiment, as illustrated in FIG. 4, when the maximum reflectiveness in the first reflection band 31 is designated as $R_1$, and the wavelength on the longer wavelength side at which the reflectiveness is reduced to half the value of the reflectiveness of $R_1$ (½$R_1$) is designated as $\lambda_2$, the wavelength range of $\lambda_2$ is preferably in the range of 1010 nm to 1210 nm. Furthermore, the lower limit of $\lambda_2$ is preferably 1050 nm, more preferably 1080 nm, and even more preferably 1090 nm. The reason why it is more preferable that the lower limit of $\lambda_2$ be 1090 nm is as follows. That is, when the peak intensity in the first radiant energy band of the solar radiation spectrum is designated as $R_{S1}$, and the solar radiation spectrum wavelength on the longer wavelength side at which the intensity is reduced to half the value of $R_{S1}$ is designated as $\lambda_{S2}$, $\lambda_{S2}$ is usually near 1090 nm. Therefore, it is preferable to set the value of $\lambda_2$ such that the relationship of $\lambda_{S2} \leq \lambda_2$ is satisfied. On the other hand, the upper limit of $\lambda_2$ is preferably 1150 nm.

Furthermore, the position of the peak wavelength in the first reflection band is not particularly limited, but it is preferable that the peak wavelength be near the peak wavelength of the first radiant energy band, and for example, the peak wavelength is preferably in the range of 900 nm to 1150 nm, and above all, in the range of 950 nm to 1100 nm. Furthermore, the distance between $\lambda_1$ and $\lambda^2$ ($\lambda_2-\lambda_1$) is, for example, preferably in the range of 50 nm to 200 nm, and above all, in the range of 100 nm to 200 nm.

Furthermore, it is preferable that the electromagnetic wave reflective film of the present invention have a second reflection band 32 in addition to the first reflection band 31, as illustrated in FIG. 5 (second embodiment). The electromagnetic wave reflective film of such a second embodiment can be obtained by making the first selective reflection layer to have a first reflection band, while making the second selective reflection layer to have the second reflection band; or in reverse, can be obtained by making the first selective reflection layer to have a second reflection band, while making the second selective reflection layer to have a first reflection band. Meanwhile, in FIG. 5, the first reflection band 31 and the second reflection band 32 are independently described for convenience; however, there is a portion where the two bands overlap, and the total reflectiveness is measured there. Furthermore, the second reflection band 32 corresponds to the second radiant energy band 22 which includes peaks that are positioned on the second shorter wavelength side in the infrared region of the solar radiation spectrum on the ground. The second radiant energy band 22 usually has peaks near the wavelength of near 1250 nm, and the wavelength range is 1150 nm to 1370 nm. The second reflection band 32 means that the wavelength that gives the maximum reflectiveness $R_2$ is in the wavelength range of the second radiant energy band 22. In the second embodiment, when the wavelength on the longer wavelength side at which the reflectiveness is reduced to half the value of the maximum reflectiveness $R_2$ (½$R_2$) is designated as $\lambda_4$, it is preferable that $\lambda_4$ is in the range of 1250 nm to 1450 nm.

Here, the reason why it is preferable that the lower limit of $\lambda_4$ be 1250 nm is as follows. That is, the peak wavelength of the second radiant energy band of the solar radiation spectrum is near 1250 nm, and the energy density of infrared rays increases near the peak wavelength. Therefore, in order to efficiently reflect infrared rays near the peak wavelength of the second radiant energy band, it is preferable that at least $\lambda_4$ at which the reflectiveness is reduced to half the value of the maximum reflectiveness R2, is greater than or equal to the peak wavelength of the second radiant energy band. Therefore, the lower limit of $\lambda_4$ is preferably 1250 nm.

Furthermore, the lower limit of $\lambda_4$ is preferably 1330 nm. The reason is as follows. That is, when the peak intensity in the second radiant energy band of the solar radiation spectrum is designated as $R_{S2}$, and the solar radiation spectrum wavelength on the longer wavelength side at which the intensity is reduced to half the value of $R_{S2}$ is designated as $\lambda_{S4}$, $\lambda_{S4}$ is near 1330 nm. Therefore, by setting the value of $\lambda_4$ such that the relationship of $\lambda_{S4} \leq \lambda_4$ is satisfied, the second reflection band can cover most of the part with a large energy density of infrared rays in the second radiant energy band. Therefore, reflection of infrared rays can be carried out more effectively.

On the other hand, the reason why it is preferable that the upper limit of $\lambda_4$ be 1450 nm is as follows. That is, as discussed above, in one selective reflection layer, the distance between $\lambda_1$ and $\lambda_2$ ($\lambda_2-\lambda_1$) is about 200 nm at the maximum. Meanwhile, $\lambda_3$ is the wavelength on the shorter wavelength side at which the reflectiveness is half the value of the reflectiveness of $R_2$ (½$R_2$). On the other hand, when it is considered that the peak of the second radiant energy band of the solar radiation spectrum is near 1250 nm, if $\lambda_4$ is made larger than 1450 nm, $\lambda_3$ is larger than 1250 nm. Thus, the second reflection band cannot cover most of the part with a large energy density of infrared rays in the second radiant energy band. Therefore, the upper limit of $\lambda_4$ is preferably 1450 nm. Also, in order for the second reflection band to cover the second radiant energy band with higher efficiency, the upper limit of $\lambda_4$ is more preferably 1400 nm.

Also, the wavelength range of $\lambda_3$ is not particularly limited, but for example, $\lambda_3$ is preferably in the range of 1050 nm to 1250 nm, and more preferably in the range of 1050 nm to 1200 nm. Furthermore, when the peak intensity in the second radiant energy band of the solar radiation spectrum is designated as $R_{S2}$, and the solar radiation spectrum wavelength on the shorter wavelength side at which the intensity is decreased to half the value of $R_{S2}$ is designated as $\lambda_{S3}$, $\lambda_{S3}$ is usually near 1150 nm. Therefore, it is preferable to set the value of $\lambda_3$ such that the relationship of $\lambda_3 \leq \lambda_{S3}$ is satisfied. Therefore, it is preferable that $\lambda_3$ be in the range of 1050 nm to 1150 nm. Also, in order for the second reflection band to cover the second radiant energy band with higher efficiency, $\lambda_3$ is more preferably in the range of 1100 nm to 1150 nm.

Furthermore, there are no particular limitations on the position of the peak wavelength of the second reflection band, but it is preferable that the peak wavelength of the second reflection band be in the vicinity of the peak wavelength of the second radiant energy band, and for example, the peak wavelength of the second reflection band is preferably in the range of 1175 nm to 1325 nm, and above all, in the range of 1225 nm to 1275 nm. Furthermore, the distance between $\lambda_3$ and $\lambda_4$ ($\lambda_4-\lambda_3$) is the same as the distance between $\lambda_1$ and $\lambda_2$ ($\lambda_2-\lambda_1$) as described above.

5. Method for Producing Electromagnetic Wave Reflective Film

The electromagnetic wave reflective film of the present invention can be produced, for example, according to the method for producing an electromagnetic wave reflective film of the present invention described in the section "A. Method for producing electromagnetic wave reflective film."

The present invention is not intended to be limited to the embodiments described above. The above embodiments are only for illustrative purposes, and any embodiment that has substantially the same constitution as the technical idea described in the claims of the present invention and gives the same operating effect, will be included in the technical scope of the present invention at any means.

EXAMPLES

Hereinafter, the present invention will be described more specifically by way of Examples. Meanwhile, the unit "parts"

that will be described below is defined to mean "parts by weight," unless particularly stated otherwise.

Example 1

A biaxially stretched film formed from polyethylene terephthalate was prepared as a transparent substrate. Subsequently, a cyclohexanone solution in which 97.4 parts of a liquid crystalline monomer molecule, OPT-01™ (manufactured by DNP Fine Chemicals Fukushima Co., Ltd.) (following structural formula (I)), which has polymerizable acrylate at both ends and has a spacer between the mesogen at the center and the acrylate, and 2.6 parts of a chiral agent having polymerizable acrylate at both ends (dextrorotatory properties, Paliocolor (registered trademark) LC756 (manufactured by BASF Corp.)) were dissolved, was prepared. Meanwhile, 5.0% by weight of a photopolymerization initiator (Irgacure 184™) and 0.06% by weight of a leveling agent (BYK-361N™), relative to the amount of the liquid crystalline monomer molecule, were added to the cyclohexanone solution (solids content 30% by weight). This was used as a first selective reflection layer forming coating solution.

[Chemical Formula 8]

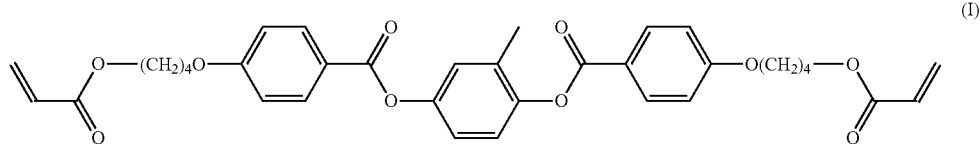

(I)

Next, a cyclohexanone solution in which 97.9 parts of a liquid crystalline monomer molecule, OPT-01™ (manufactured by DNP Fine Chemicals Fukushima Co., Ltd.) (following structural formula (I)), which has polymerizable acrylate at both ends and has a spacer between the mesogen at the center and the acrylate, and 2.1 parts of a chiral agent having polymerizable acrylate at both ends (dextrorotatory properties, Paliocolor (registered trademark) LC756 (manufactured by BASF Corp.)) were dissolved, was prepared. Meanwhile, 5.0% by weight of a photopolymerization initiator (Irgacure 184™) and 0.06% by weight of a leveling agent (BYK-361N™), relative to the amount of the liquid crystalline monomer molecule, were added to the cyclohexanone solution (solids content 30% by weight). This was used as a second selective reflection layer forming coating solution.

Subsequently, the first selective reflection layer forming coating solution was applied on the biaxially stretched film by using a bar coater, without an alignment layer interposed therebetween. Subsequently, the applied film was maintained at 100° C. for 2 minutes, and cyclohexanone in the first selective reflection layer forming coating solution was evaporated. The liquid crystalline monomer molecules were aligned, and thus a dextrorotatory coating film (a first selective reflection layer forming layer) was obtained. Then, the first selective reflection layer forming layer thus obtained was irradiated with ultraviolet rays at a dose of 50 mJ/cm$^2$ (the dose was measured with W-351™ manufactured by Orc Manufacturing Co., Ltd.; hereinafter, the same) by using an ultraviolet irradiating apparatus (manufactured by Fusion UV Systems Japan KK., H Bulb; hereinafter, the same). Thus, the acrylate of the liquid crystalline monomer molecules that was aligned, and the acrylate of the chiral agent were three-dimensionally crosslinked and polymerized by means of the radical generated from the photopolymerization initiator in the first selective reflection layer forming layer, and a cholesteric structure was fixed onto the biaxially stretched film. Thereby, a first selective reflection layer (thickness: 5 μm) was formed. At this time, the contact angle to pure water on the surface of the first selective reflection layer was 77.1°, and the Vickers hardness was 12.7.

Furthermore, the second selective reflection layer forming coating solution described above was applied on the first selective reflection layer by using a bar coater. Subsequently, the assembly was maintained at 100° for 2 minutes, and cyclohexanone in the second selective reflection layer forming coating solution was evaporated. The liquid crystalline monomer molecules were aligned, and thus dextrorotatory coating film (a second selective reflection layer forming layer) was obtained. The second selective reflection layer forming layer thus obtained was irradiated with ultraviolet rays at a dose of 800 mJ/cm$^2$ by using an ultraviolet irradiating apparatus. Thus, the acrylate of the liquid crystalline monomer molecules that was aligned, and the acrylate of the chiral agent were three-dimensionally crosslinked and polymerized by means of the radical generated from the photopolymerization initiator in the second selective reflection layer forming layer, and a cholesteric structure was fixed thereon. Thereby, a second selective reflection layer (thickness: 5 μm) was formed. Thereby, an electromagnetic wave reflective film 1 was obtained.

Example 2

A cyclohexanone solution in which 96.0 parts of a liquid crystalline monomer molecule, OPT-01™ (manufactured by DNP Fine Chemicals Fukushima Co., Ltd.) (following structural formula (I)), which has polymerizable acrylate at both ends and has a spacer between the mesogen at the center and the acrylate, and 4.0 parts of a chiral agent having polymerizable acrylate at both ends (levorotatory properties, CNL-716™ (manufactured by ADEKA Corp.)) were dissolved, was prepared. Meanwhile, 5.0% by weight of a photopolymerization initiator (Irgacure 184™) and 0.06% by weight of a leveling agent (BYK-361N™), relative to the amount of the liquid crystalline monomer molecule, were added to the cyclohexanone solution (solids content 30% by weight). This was used as a second selective reflection layer forming coating solution. An electromagnetic wave reflective film 2 was obtained by the same method as that used in Example 1, except that this second selective reflection layer forming coating solution was used.

Meanwhile, the contact angle to pure water on the surface of the first selective reflection layer was 78.7°, and the Vickers hardness was 13.1.

Comparative Example 1

An electromagnetic wave reflective film 3 was obtained by the same method as that used in Example 1, except that the dose of ultraviolet irradiation irradiated to the first selective reflection layer forming layer was changed to 1600 mJ/cm$^2$.

Comparative Example 2

An electromagnetic wave reflective film 4 was obtained by the same method as that used in Example 2, except that the dose of ultraviolet irradiation irradiated to the first selective reflection layer forming layer was changed to 1600 mJ/cm$^2$.

[Evaluation]

For the electromagnetic wave reflective films 1 to 4 produced in Examples 1 and 2, and Comparative Examples 1 and 2, the specular reflectiveness of the second selective reflection layer was measured. The results are presented in FIGS. 6A and 6B. FIG. 6A is a graph illustrating the measurement results for Example 1 and Comparative Example 1, and FIG. 6B is a graph illustrating the measurement results for Example 2 and Comparative Example 2. Furthermore, the haze was measured for the electromagnetic wave reflective films 1 to 4 produced in Examples 1 and 2, and Comparative Examples 1 and 2. As a result, the haze value was 0.8% for the electromagnetic wave reflective film 1 (Example 1), 0.9% for the electromagnetic wave reflective film 2 (Example 2), 1.7% for the electromagnetic wave reflective film 3 (Comparative Example 1), and 2.0% for the electromagnetic wave reflective film 4 (Comparative Example 2). Meanwhile, the haze value was measured according to JIS K7136 by using HM-150™ manufactured by Murakami Color Research Laboratory Co., Ltd., as a measuring apparatus.

REFERENCE SIGNS LIST

10 ELECTROMAGNETIC WAVE REFLECTIVE FILM
11 TRANSPARENT SUBSTRATE
12 FIRST SELECTIVE REFLECTION LAYER
12' FIRST SELECTIVE REFLECTION LAYER FORMING LAYER
13 SECOND SELECTIVE REFLECTION LAYER
13' SECOND SELECTIVE REFLECTION LAYER FORMING LAYER

The invention claimed is:

1. A method for producing an electromagnetic wave reflective film, the method comprising steps of:
a first selective reflection layer forming process of: using a transparent substrate; applying a first selective reflection layer forming coating solution containing a rodlike compound represented by the following structural formula (I), a first chiral agent that imparts rotatory properties to the rodlike compound, and a first leveling agent, on the transparent substrate to form a first selective reflection layer forming layer; irradiating the first selective reflection layer forming layer with ultraviolet ray at a dose in the range of 25 mJ/cm$^2$ to 800 mJ/cm$^2$; and thereby forming a first selective reflection layer; and a second selective reflection layer forming process of: using a second selective reflection layer forming coating solution containing a rodlike compound represented by the following structural formula (I), a second chiral agent that imparts rotatory properties to the rodlike compound, and a second leveling agent; applying the second selective reflection layer forming coating solution on the first selective reflection layer so as to be in direct contact therewith to form a second selective reflection layer forming layer; irradiating the second selective reflection layer forming layer with ultraviolet ray; and thereby forming a second selective reflection layer:

[Chemical Formula 1]

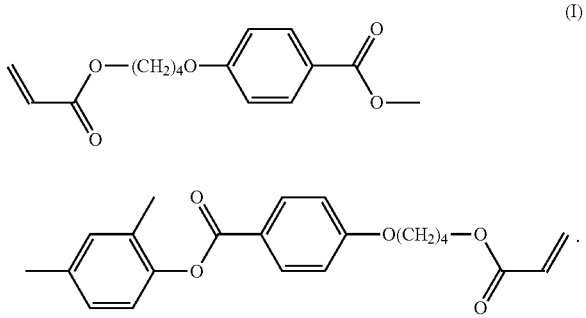

2. The method for producing an electromagnetic wave reflective film according to claim 1, wherein a contact angle to pure water on a surface of the first selective reflection layer is in the range of 65° to 85°.

3. The method for producing an electromagnetic wave reflective film according to claim 1, wherein a Vickers hardness of a surface of the first selective reflection layer is in the range of 5 to 25.

4. An electromagnetic wave reflective film, comprising a transparent substrate; a first selective reflection layer that is formed on the transparent substrate and contains a rodlike compound represented by the following structural formula (I) which forms a cholesteric structure; and a second selective reflection layer that is formed on the first selective reflection layer and contains a rodlike compound represented by the following structural formula (I) which forms a cholesteric structure, wherein the second selective reflection layer is formed on the first selective reflection layer so as to be in direct contact therewith, and a proportion of specularly reflected light in light that is selectively reflected at the second selective reflection layer is 80% or greater, and wherein the first selective reflection layer is formed by irradiating a first selective reflection layer forming layer with ultraviolet ray at dose in range of 25 mJ/cm$^2$ to 800 mJ/cm$^2$ and the first selective reflection layer forming layer is formed by applying a first selective reflection layer forming coating solution containing the rodlike compound, a first chiral agent that imparts rotatory properties to the rodlike compound, and a first leveling agent:

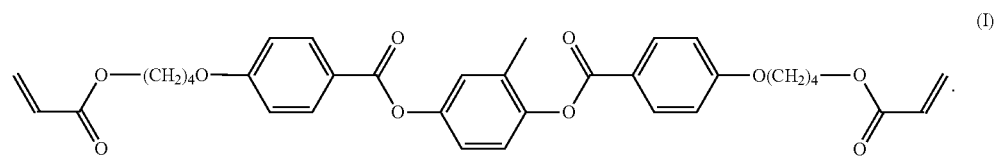
(I)